(12) United States Patent
Hughes et al.

(10) Patent No.: US 9,807,061 B2
(45) Date of Patent: *Oct. 31, 2017

(54) PRIVACY SERVER FOR PROTECTING PERSONALLY IDENTIFIABLE INFORMATION

(71) Applicant: Pearson Education, Inc., New York, NY (US)

(72) Inventors: Richard Paul Hughes, Mesa, AZ (US); Hong-Yu Chiang, Boyds, MD (US); Gregory Dean McFall, Poolesville, MD (US); Perry Michael Spagnola, Chandler, AZ (US)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,374

(22) Filed: Nov. 7, 2016

(65) Prior Publication Data
US 2017/0054689 A1 Feb. 23, 2017

Related U.S. Application Data

(63) Continuation of application No. 14/614,279, filed on Feb. 4, 2015, now Pat. No. 9,542,573, which is a continuation of application No. 13/655,507, filed on Oct. 19, 2012, now Pat. No. 8,984,650.

(51) Int. Cl.
*H04L 29/06* (2006.01)
*G06F 21/62* (2013.01)

(52) U.S. Cl.
CPC ...... *H04L 63/0421* (2013.01); *G06F 21/6245* (2013.01); *G06F 21/6254* (2013.01); *H04L 63/0281* (2013.01)

(58) Field of Classification Search
CPC ............. H04L 63/0421; H04L 63/0281; G06F 21/6254; G06F 21/6245
See application file for complete search history.

(56) References Cited

U.S. PATENT DOCUMENTS

| | | | |
|---|---|---|---|
| 4,175,339 | A | 11/1979 | Jones |
| 5,947,747 | A | 9/1999 | Walker et al. |
| 6,148,342 | A | 11/2000 | Ho |

(Continued)

FOREIGN PATENT DOCUMENTS

DE 10327291 A1 2/2005

OTHER PUBLICATIONS (ACM Snapshot) U.S. Appl. No. 13/655,507.
(Continued)

*Primary Examiner* — Matthew Smithers
(74) *Attorney, Agent, or Firm* — Kilpatrick Townsend & Stockton LLP

(57) ABSTRACT

A privacy server protects private information by substituting a token or an identifier for the private information. The privacy server recognizes that a communication includes private information and intercepts the communication. The privacy server replaces the private information with a random or pseudo-random token or identifier. The privacy server maintains the private information in a local database and associates the private information for a particular person with the token or identifier for that person.

23 Claims, 9 Drawing Sheets

(56) References Cited

U.S. PATENT DOCUMENTS

| | | |
|---|---|---|
| 6,182,141 B1 | 1/2001 | Blum et al. |
| 6,401,125 B1 | 6/2002 | Makarios et al. |
| 6,484,010 B1 | 11/2002 | Sheehan |
| 6,534,701 B2 | 3/2003 | Isozaki et al. |
| 6,688,889 B2 | 2/2004 | Wallace et al. |
| 6,704,787 B1 | 3/2004 | Umbreit |
| 6,757,742 B1 | 6/2004 | Viswanath et al. |
| 6,808,392 B1 | 10/2004 | Walton |
| 6,959,420 B1 | 10/2005 | Mitchell et al. |
| 7,054,648 B2 | 5/2006 | Abtin et al. |
| 7,107,447 B2 | 9/2006 | Sanin et al. |
| 7,123,613 B1 | 10/2006 | Chawla et al. |
| 7,213,258 B1 | 5/2007 | Kesarwani et al. |
| 7,370,015 B2 | 5/2008 | Gvily |
| 7,797,726 B2 * | 9/2010 | Ashley ............... H04L 63/0407 726/1 |
| 7,844,717 B2 | 11/2010 | Herz et al. |
| 7,877,494 B2 | 1/2011 | Carlton et al. |
| 7,920,050 B2 | 4/2011 | Juels et al. |
| 7,984,169 B2 | 7/2011 | Brunell et al. |
| 8,016,680 B1 | 9/2011 | Hutter et al. |
| 8,033,831 B2 | 10/2011 | Julia et al. |
| 8,052,426 B2 | 11/2011 | Snyder et al. |
| 8,135,621 B2 | 3/2012 | Vishik et al. |
| 8,316,237 B1 | 11/2012 | Felsher et al. |
| 8,526,405 B2 | 9/2013 | Curtis |
| 8,561,185 B1 | 10/2013 | Muthusrinivasan et al. |
| 8,578,157 B2 | 11/2013 | Pestoni et al. |
| 8,641,424 B2 | 2/2014 | Soldavini |
| 8,753,200 B1 | 6/2014 | Supanc et al. |
| 8,984,650 B2 * | 3/2015 | Hughes ............... G06F 21/6245 726/26 |
| 9,076,021 B2 | 7/2015 | Pittelko |
| 9,189,968 B2 | 11/2015 | Mills et al. |
| 9,406,239 B2 | 8/2016 | Spagnola et al. |
| 9,412,281 B2 | 8/2016 | Spagnola |
| 9,436,911 B2 | 9/2016 | Spagnola et al. |
| 9,446,314 B2 | 9/2016 | Spagnola et al. |
| 9,542,573 B2 * | 1/2017 | Hughes ............... G06F 21/6245 |
| 9,590,989 B2 | 3/2017 | Spagnola |
| 2002/0160347 A1 | 10/2002 | Wallace |
| 2002/0165912 A1 | 11/2002 | Wenocur et al. |
| 2002/0174364 A1 | 11/2002 | Nordman et al. |
| 2003/0047620 A1 | 3/2003 | Litherland et al. |
| 2003/0080997 A1 | 5/2003 | Fuehren et al. |
| 2003/0097383 A1 | 5/2003 | Smirnov et al. |
| 2003/0204445 A1 | 10/2003 | Vishik et al. |
| 2004/0009461 A1 | 1/2004 | Snyder et al. |
| 2004/0049687 A1 | 3/2004 | Orsini et al. |
| 2004/0083229 A1 | 4/2004 | Porter |
| 2004/0093346 A1 | 5/2004 | Hochman et al. |
| 2004/0133625 A1 | 7/2004 | Plessmann |
| 2004/0199782 A1 | 10/2004 | Arnold |
| 2004/0210770 A1 | 10/2004 | Sanin et al. |
| 2005/0060221 A1 | 3/2005 | Kolar et al. |
| 2006/0177061 A1 | 8/2006 | Orsini et al. |
| 2006/0257841 A1 | 11/2006 | Mangano |
| 2007/0274489 A1 | 11/2007 | Yamamura et al. |
| 2007/0292826 A1 | 12/2007 | Goddy et al. |
| 2008/0040370 A1 | 2/2008 | Bosworth et al. |
| 2008/0235336 A1 | 9/2008 | Stern et al. |
| 2009/0075709 A1 | 3/2009 | Park |
| 2009/0170058 A1 | 7/2009 | Walker |
| 2009/0197237 A1 | 8/2009 | Couch et al. |
| 2009/0226872 A1 | 9/2009 | Gunther et al. |
| 2010/0036884 A1 | 2/2010 | Brown |
| 2010/0143873 A1 | 6/2010 | Keim et al. |
| 2010/0293598 A1 | 11/2010 | Collart |
| 2011/0039242 A1 | 2/2011 | Packard et al. |
| 2011/0072039 A1 | 3/2011 | Tayloe |
| 2011/0072142 A1 | 3/2011 | Herz et al. |
| 2011/0099202 A1 | 4/2011 | Dedeoglu et al. |
| 2011/0177480 A1 | 7/2011 | Menon et al. |
| 2011/0189643 A1 | 8/2011 | Hutchinson |
| 2011/0195389 A1 | 8/2011 | DeYoung et al. |
| 2011/0202774 A1 | 8/2011 | Kratsch et al. |
| 2011/0208668 A1 | 8/2011 | Phillips |
| 2011/0255688 A1 | 10/2011 | Spalink |
| 2012/0040326 A1 | 2/2012 | Larson-Rutter |
| 2012/0210118 A1 | 8/2012 | Chaves et al. |
| 2012/0231438 A1 | 9/2012 | Fakhrai |
| 2013/0018812 A1 | 1/2013 | Cherner et al. |
| 2013/0111570 A1 * | 5/2013 | Kaariainen ............ H04L 63/08 726/5 |
| 2013/0310166 A1 | 11/2013 | Higgins et al. |
| 2014/0024009 A1 | 1/2014 | Nealon et al. |
| 2014/0041653 A1 | 2/2014 | Patton et al. |
| 2014/0281491 A1 | 9/2014 | Zaverucha et al. |
| 2014/0310729 A1 | 10/2014 | Chaniotakis |
| 2015/0066940 A1 | 3/2015 | Fernandes |
| 2015/0119120 A1 | 4/2015 | Spagnola |
| 2015/0150144 A1 | 5/2015 | Hughes et al. |
| 2015/0179078 A1 | 6/2015 | Spagnola |
| 2015/0187223 A1 | 7/2015 | Kapoor et al. |
| 2015/0199909 A1 | 7/2015 | Spagnola |
| 2016/0042198 A1 | 2/2016 | Kapoor et al. |
| 2016/0335537 A1 | 11/2016 | Spagnola |
| 2016/0335538 A1 | 11/2016 | Spagnola |
| 2016/0335539 A1 | 11/2016 | Spagnola |
| 2016/0335541 A1 | 11/2016 | Spagnola |

OTHER PUBLICATIONS (IEEE Snapshot) U.S. Appl. No. 13/655,507.
Ai, et al., "Design and Development of Learning Management System at Universiti Putra Malaysia: A Case Study of e-SPRINT", 2006, ACM, pp. 979-980.
Angin, et al., "An Entity-Centric Approach for Privacy and Identity Management in Cloud Computing," IEEE, 2010, p. 177-183.
Aura, et al., "Scanning Electronic Documents for Personally Identifiable Information," ACM, Oct. 2006, p. 41-49.
Chakravorty, et al., "Privacy Preserving Data Analytics for Smart Phones," IEEE, 2013, p. 23-27.
Darbhamulia, et al., "Paving the Way Towards an Efficient Learning Management System", 2004, ACM, pp. 428-433.
Gay, et al. "Adapting Learning Environments with Access for All", 2009, ACM, pp. 90-91.
Hu, "Privacy-Preserving WebID Analytics on the Decentralized Policy-Aware Social Web," ACM, Aug. 2014, p. 503-510.
Muller, et al. "Secure Business Processes in Service-Oriented Architectures—a Requirements Analysis", 2010, IEEE, pp. 35-42.
Quantiles.com; The Quantile Framework for Mathematics; Feb. 18, 2006. [online], retrieved on Feb. 9, 2014]. Retrieved from the Wayback Machine, archive.org https://web.archive.org/web/20060218165157//http://www.quantiles.com/EntrancePageFlash.html?, 1 page.
Schneier, Wiley, "Applied Cryptography," 1996, pp. 1-2 and 10-13.
U.S. Appl. No. 13/932,356, filed Jul. 1, 2013, by Pearson Education, Inc., 51 pages.
U.S. Appl. No. 14/089,432, filed Nov. 25, 2013, by Pearson Education, Inc. 44 pages.
Non-Final Office Action dated Feb. 13, 2014, for U.S. Appl. No. 14/089,432, 10 pages.
Non-Final Office Action dated Jul. 22, 2014, for U.S. Appl. No. 14/089,432, 6 pages.
U.S. Appl. No. 14/103,576, filed Dec. 11, 2013, by Pearson Education, Inc., 52 pages.
Notice of Allowance dated Feb. 7, 2014, for U.S. Appl. No. 14/103,576, filed Dec. 11, 2013, 9 pages.
U.S. Appl. No. 14/137,890, filed Dec. 20, 2013, by Pearson Education, Inc. 59 pages.
First Action Interview Pilot Program Pre-Interview Communication dated Mar. 4, 2014, for U.S. Appl. No. 14/137,890, 4 pages.
Notice of Allowance dated May 28, 2014, for U.S. Appl. No. 14/137,890, filed Dec. 20, 2013, 14 pages.
Final Office Action dated Jan. 2, 2015, for U.S. Appl. No. 14/137,890, filed Dec. 20, 2013, 6 pages.
Non-Final Office Action dated Jun. 19, 2015, for U.S. Appl. No. 14/137,890, filed Dec. 20, 2013, 8 pages.

(56) References Cited

OTHER PUBLICATIONS

First Action Interview Pilot Program Pre-Interview Communication dated Sep. 23, 2014, for U.S. Appl. No. 14/154,050, 5 pages.
Non-Final Office Action dated May 19, 2015, for U.S. Appl. No. 14/524,948, 15 pages.
Final Office Action dated Dec. 10, 2015, for U.S. Appl. No. 14/524,948, 10 pages.
U.S. Appl. No. 14/724,620, filed May 28, 2015, by Pearson Education, Inc., 65 pages.
Notice of Allowance and Fees Due dated Nov. 6, 2015, for U.S. Appl. No. 14/724,620, 21 pages.
First Action Interview Pilot Program Pre-Interview Communication dated Dec. 15, 2015, for U.S. Appl. No. 14/754,337, 6 pages.
U.S. Appl. No. 14/754,337, filed Jun. 29, 2015, by Perry M. Spagnola, 130 pages.
First Action Interview Pilot Program Pre-Interview Communication dated Sep. 3, 2015, in U.S. Appl. No. 14/788,228, 23 pages.
Applicant-Initiated Interview Summary dated Oct. 29, 2015, in U.S. Appl. No. 14/788,228, 10 pages.
Final Office Action dated Feb. 19, 2016, for U.S. Appl. No. 14/788,228, 41 pages.
Final Office Action for U.S. Appl. No. 13/655,507, dated Jun. 13, 2014, 30 pages.
Non-Final Office Action for U.S. Appl. No. 13/655,507, dated Dec. 19, 2013, 24 pages.
Notice of Allowance for U.S. Appl. No. 13/655,507, dated Nov. 7, 2014, 11 pages.
Advisory Action for U.S. Appl. No. 14/089,432, dated Apr. 19, 2016, 3 pages.
Applicant Initiated Interview Summary for U.S. Appl. No. 14/089,432, dated May 29, 2014, 3 pages.
Applicant Initiated Interview Summary for U.S. Appl. No. 14/089,432, dated Oct. 15, 2014, 3 pages.
Final Office Action for U.S. Appl. No. 14/089,432, dated Dec. 19, 2014, 5 pages.
Final Office Action for U.S. Appl. No. 14/089,432, dated Feb. 11, 2016, 9 pages.
Non-Final Office Action for U.S. Appl. No. 14/089,432, dated Jul. 1, 2015, 8 pages.
Notice of Allowance for U.S. Appl. No. 14/089,432, dated Jun. 21, 2016, 5 pages.
Advisory Action for U.S. Appl. No. 14/137,890, dated Apr. 19, 2016, 3 pages.
Applicant Initiated Interview Summary for U.S. Appl. No. 14/137,890, dated Oct. 16, 2014, 3 pages.
Applicant Initiated Interview Summary for U.S. Appl. No. 14/137,890, dated Apr. 16, 2014, 3 pages.
Final Office Action for U.S. Appl. No. 14/137,890, dated Feb. 8, 2016, 9 pages.
Non-Final Office Action for U.S. Appl. No. 14/137,890, dated Aug. 8, 2014, 5 pages.
Notice of Allowance for U.S. Appl. No. 14/137,890, dated Jun. 22, 2016, 8 pages.
Final Office Action for U.S. Appl. No. 14/144,437, dated May 13, 2015, 7 pages.
First Action Interview Office Action Summary for U.S. Appl. No. 14/144,437, dated Sep. 5, 2014, 3 pages.
Advisory Action for U.S. Appl. No. 14/154,050, dated Mar. 29, 2016, 3 pages.
Final Office Action for U.S. Appl. No. 14/154,050, dated Mar. 12, 2015, 15 pages.
Final Office Action for U.S. Appl. No. 14/154,050, dated Jan. 13, 2016, 8 pages.
First Action Interview Office Action Summary—2 Mo, for U.S. Appl. No. 14/154,050, dated Nov. 10, 2014, 6 pages.
Non-Final Office Action for U.S. Appl. No. 14/154,050, dated Jul. 27, 2015, 6 pages.
Notice of Allowance for U.S. Appl. No. 14/524,948, dated May 13, 2016, 7 pages.
Pre-Interview First Office Action for U.S. Appl. No. 14/524,948, dated Jan. 9, 2015, 5 pages.
Notice of Allowance for U.S. Appl. No. 14/614,279, dated Aug. 25, 2016, 9 pages.
Notice of Allowance for U.S. Appl. No. 14/754,337, dated Apr. 29, 2016, 12 pages.
Advisory Action for U.S. Appl. No. 14/788,228, dated Feb. 16, 2017, 8 pages.
Final Office Action for U.S. Appl. No. 14/788,228, dated Nov. 23, 2016, 17 pages.
First Action Interview Office Action Summary for U.S. Appl. No. 14/788,228, dated Oct. 29, 2015, 5 pages.
Non-Final Office Action for U.S. Appl. No. 14/788,228, dated Jul. 14, 2016, 28 pages.
First Action Interview Office Action Summary for U.S. Appl. No. 15/017,408, dated Jul. 26, 2016, 4 pages.
First Action Interview Pilot Program Pre-Interview Communication for U.S. Appl. No. 15/017,408, dated May 6, 2016, 4 pages.
Heurix, "Pseudonymization with metadata encryption for privacy-preserving searchable documents", System Science (HICSS), 2012 45th Hawaii International Conference, 2012, pp. 3011-3020.
Neubauer et al., "A methodology for the pseudonymization of medical data.", Int J Med Inform., vol. 80, No. 3, Mar. 2011, pp. 190-204.
Noumeir et al., "Pseudonymization of radiology data for research purposes.", J Digit Imaging., vol. 20, No. 3, Sep. 2007, pp. 284-295.
International Preliminary Report on Patentability for PCT/US2015/037505, dated Jan. 12, 2017, 8 pages.
International Search Report and Written Opinion for PCT/US2015/037505, dated Sep. 29, 2015, 9 pages.
Non-Final Office Action for U.S. Appl. No. 15/456,018, dated Jun. 9, 2017, 12 pages.

* cited by examiner

PRIVACY SERVER FOR PROTECTING PERSONALLY IDENTIFIABLE INFORMATION

CROSS-REFERENCES TO RELATED APPLICATIONS

This application is a continuation application of U.S. Non-Provisional patent application Ser. No. 14/614,279 filed on Feb. 4, 2015, which is a continuation application of and claims priority to U.S. Non-Provisional patent application Ser. No. 13/655,507, filed on Oct. 19, 2012. Each of these applications is hereby incorporated by reference in its entirety for all purposes.

FIELD OF THE INVENTION

The invention generally relates to the protection of personally identifiable information and more particularly to the substitution of a token or identifier for the personally identifiable information by a privacy server.

BACKGROUND OF THE INVENTION

The protection of personally identifiable information (PII) is of concern as more and more information is stored and shared electronically. There are a number of laws that govern how PII can be used and how it must be protected. For example, some Canadian provinces have enacted laws to address how private electronic information, such as PII, collected by public Canadian institutions can be handled. These laws require that private data not cross provincial or Canadian borders, or be accessed by citizens or authorities of other countries. These types of laws may limit the ability of provincial residents to use applications or services that are hosted outside of the province if the application requests PII. It is not uncommon for the server that hosts an application or service to be located in a different jurisdiction from the user of the application or service. For example, a provider of a learning management system (LMS) may host the software for the LMS on a server in one jurisdiction, but serve students in a number of other jurisdictions. However, the LMS may not be able to serve students of an institution located in a jurisdiction that prohibits the transmission of the student's PII outside the jurisdiction when the LMS is located outside the jurisdiction.

To accommodate laws that prohibit the transmission of PII outside the jurisdiction or otherwise require special handling of PII, a provider can choose to host its application or service within that jurisdiction or to provide specific applications or services to address the special handling required by that jurisdiction. However, these approaches increase cost and complexity for the provider. Alternatively, a user or institution can choose to limit themselves to only those applications and services that are hosted within their jurisdiction or that provide the special handling of PII, but in doing so may deprive themselves of access to the best available resources.

Since users want access to the best available applications and solutions regardless of where they may be hosted, there is a need for a solution that protects PII without requiring separate hosting or special handling for different jurisdictions.

BRIEF SUMMARY OF THE INVENTION

Aspects of the invention relate to a privacy server and methods of operating the privacy server to protect private information. A privacy server interfaces with a user's computer system and another server, such as an application server. The privacy server protects private information received from the user's computer system by sending a token or identifier to the application server instead of the private information.

The privacy server recognizes when the user is communicating private information to the application and intercepts the communication. The privacy server replaces the private information with a random or pseudo-random token or identifier. The privacy server maintains the private information in a local database and associates the private information for a particular person with a token or identifier for that person. Communications from the application to the user also pass through the privacy server. If a communication includes the token or identifier, then the privacy server intercepts the communication and replaces the token with the user's private information prior to presenting the communication to the user.

Other features, advantages, and objects of the present invention will be apparent to those skilled in the art with reference to the remaining text and drawings of this application.

BRIEF DESCRIPTION OF THE DRAWINGS

These and other features, aspects, and advantages of the present disclosure are better understood when the following Detailed Description is read with reference to the accompanying drawings, where.

DETAILED DESCRIPTION OF THE INVENTION

Aspects of the present invention are directed to a privacy server that maintains private information at the privacy server while using applications or services hosted on other servers. In some instances, the privacy server can be used to maintain private data within one jurisdiction even though a user is accessing an application hosted on a server located outside the jurisdiction. The privacy server intercepts communications between a user and an application that include private information. The privacy server creates a token or identifier that does not disclose the private information and uses the token or identifier instead of the private information when communicating with other servers and systems. In some instances, the operation of the privacy server in substituting a token or identifier for private information may be transparent to both the user and to the other servers and systems.

The scope of private information may vary, but generally includes any information unique to an individual, such as name, home address, opinions, educational records, age, gender, income, medical records, and/or financial data. The terms private information and personally identifiable information (PII) are used interchangeably herein. Information that is not private, i.e., not identified or linked to an individual is referred to herein as anonymous.

Exemplary Operating Environment

Figure 1:
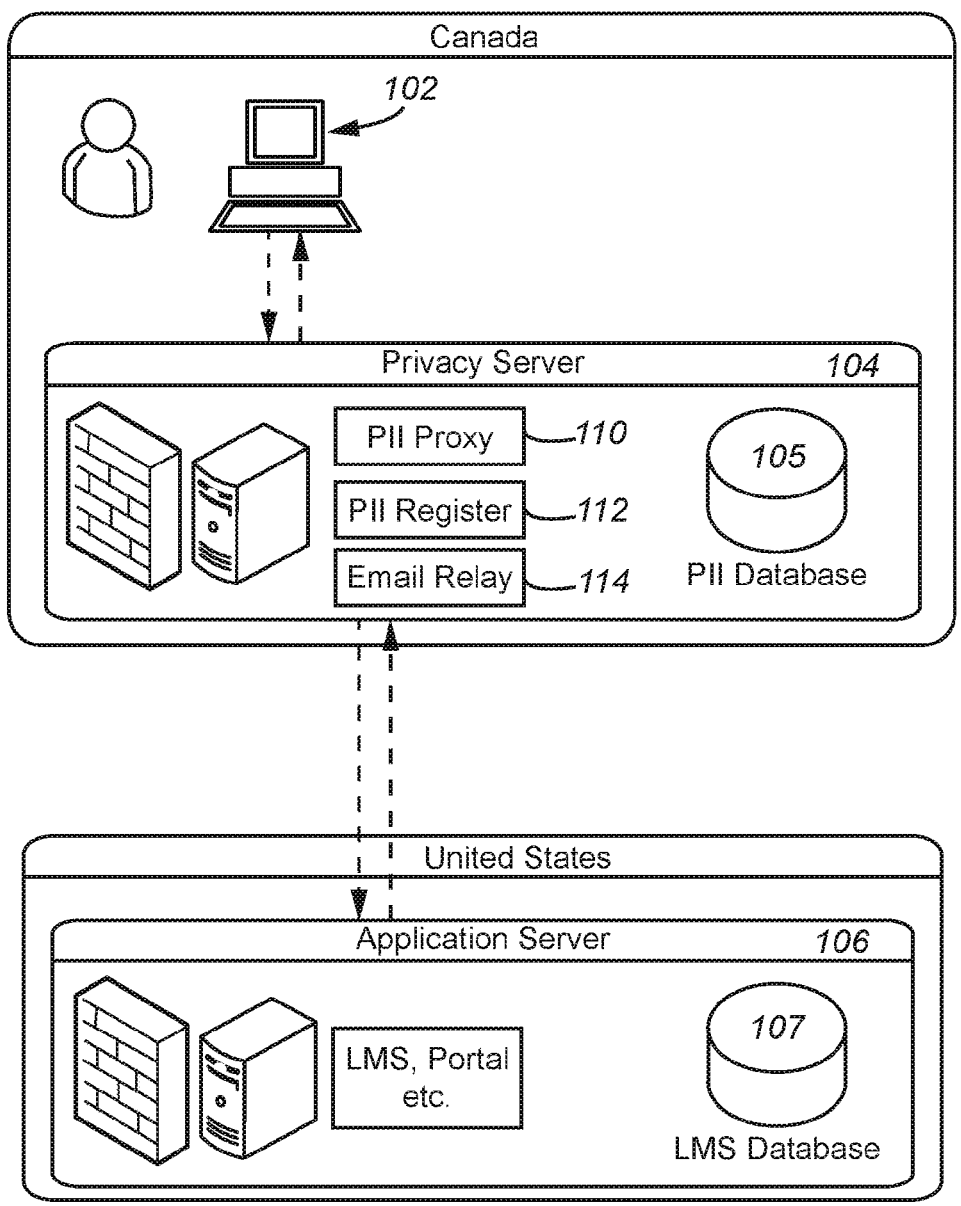
FIG. 1 is a block diagram illustrating an exemplary privacy server.

FIG. 1 illustrates an exemplary relationship between the user's computer system 102, the privacy server 104, and the application server 106. Both the user's computer system 102 and the privacy server 104 are located in the same jurisdiction. The application server 106 is located in a different jurisdiction. FIG. 1 illustrates that the user's computer system 102 and the privacy server 104 are located in Canada and that the application server 106 is located in the United States. Although FIG. 1 illustrates that the jurisdictions are based on country boundaries, other types of jurisdictional boundaries may be used. For example, if a state or a province has privacy requirements that are more stringent than the applicable national privacy requirements, then the user's computer system and the privacy server may be in one state or province and the application server may be in a different state or province, but all may be located in the same country.

Although not shown in FIG. 1, the application server can be connected to additional privacy servers and/or connected directly to additional user systems. The additional privacy servers and/or user systems may be located in the same or additional jurisdictions. The privacy server may be configured to allow it to interact with an application or application server without the application or application server recognizing that it is interacting with the privacy server.

A user may access an application hosted on the application server, such as a cloud-based application, i.e., an application resident on the application server and accessible via a network, such as the Internet. The user's communications with the application pass through the privacy server. The privacy server recognizes when the user is communicating PII to the application and intercepts the communication. The privacy server replaces the PII with a random or pseudo-random token or identifier. The privacy server maintains the PII in the local PII database 105 and associates the PII for a particular user with an identifier for that user. An identifier, such as a PII identifier, maybe a random or pseudo-random string. The privacy server may decorate the PII identifier to create a token. The application hosted by the application server receives the token from the privacy server and uses it to identify a user. In some instances, the application does not distinguish between a received token and received PII, which may allow an existing application to work with users that access the application via a privacy server, as well as users that access the application directly.

The application may maintain the token in the database associated with the application server, illustrated by the LMS database in FIG. 1. If the application is capable of receiving both tokens and PII, then the tokens are maintained in a manner similar to that used to maintain PII. The LMS database is distinct from the PII database so that the application does not receive or use the user's PII.

Any communication from the application to the user also passes through the privacy server. If the communication includes a token, then the privacy server intercepts the communication and replaces the token with the user's PII prior to presenting the communication to the user. In this manner, the existence and operation of the privacy server is transparent to the user.

Although FIG. 1 illustrates one possible configuration, the features discussed herein are not limited to any particular hardware architecture or configuration. The user's computer system, the privacy server and the application server may include a computing device, as well as a non-transitory computer-readable medium capable of storing code and may be capable of the operations described herein. One example of a computing device is a multipurpose computer system capable of executing software or other code. Examples of non-transitory computer-readable medium include electronic, optical, magnetic, or other storage device capable of storing computer-readable instructions. Other examples include, but are not limited to, a floppy disk, CD-ROM, DVD, magnetic disk, memory chip, ROM, RAM, an ASIC, or any other medium from which a computer processor can read instructions. The user's computer system, the privacy server, and the application server may communicate via any type of a network including, but not limited to, a wired or wireless network.

Exemplary Operation

FIG. 1 illustrates that the privacy server may include modules to support a PII registration process 112, as well as a PII proxy process 110 and an e-mail relay process 114. The operation of the privacy server will now be described with reference to a registration process where the privacy server generates and uses a token. A non-limiting example of an educational application, such as a Learning Management System (LMS), that is capable of using student PII is used for illustration.

Figure 2:
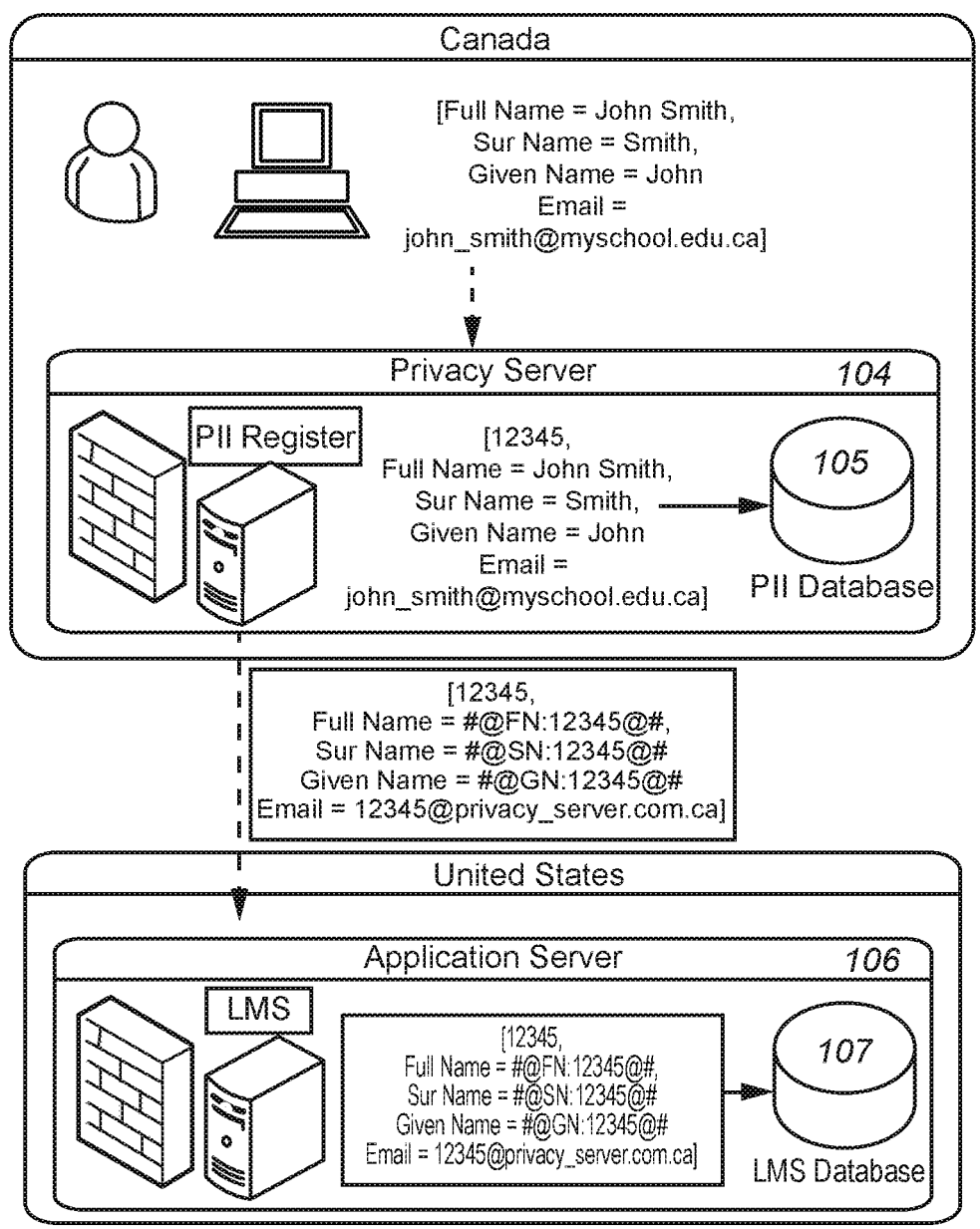
FIG. 2 is a block diagram illustrating an exemplary registration process using a privacy server.

In this example, a teacher registers a student by entering the student's information, including PII, via a system, such as the user's computer system 102 of FIG. 2. The teacher may enter the information by uploading a spreadsheet that includes information for one or more students or may enter the information via a registration form or page. The privacy server recognizes that student information is being entered as part of the registration process and intercepts the information. In some instances, the privacy server recognizes that a spreadsheet has been uploaded that is associated with PII. In other instances, the privacy server recognizes that the teacher is accessing a registration form or page. In one exemplary implementation, the privacy server is programmed to recognize that a particular form or web page is being loaded and intercepts the PII entered into the form or web page prior to communicating it to the application server.

The teacher is unaware that the privacy server is intercepting any student information. The teacher interacts with the application in the same manner as the teacher would if there was no privacy server. As will be apparent to those skilled in the art, there are other ways that the privacy server may recognize PII, including, but not limited to being configured to recognize certain actions or sequences associated with a user's interaction with the application or to recognize certain types of information.

Once the privacy server intercepts the PII, the privacy server saves the PII locally and generates a PII identifier. In this example, the PII includes the student's name, John Smith, and the student's e-mail address, "john smith@myschool.edu.ca". The student's name and e-mail address are saved in the PII database and are associated with the PII identifier, which in this example is "12345".

The PII identifier is a random or pseudo-random character string. The character string can be an alphabetic character string, a numeric character string, or an alpha-numeric character string. The PII is not used to generate the PII identifier. Instead other types of information, including, but not limited to the time of day or a portion of the network address of the user's computer system may be used to generate the PII identifier. The PII identifier uniquely identifies the student or other entity within the scope of the privacy server. The PII identifier may be generated by a computer-implemented method provided by the privacy server. One example of a PII identifier is a GUID or globally unique identifier. In some instances the PII identifier includes designated characters that can be used for sorting. For example, a PII identifier may include characters that represent the first few letters of the student's sur name to support sorting alphabetically by sur name. In this instance the PII identifier is not completely random, but still protects the student's PII.

As shown in FIG. 2, the privacy server 102 may use attributes or attribute codes to identify different types of PII. For example, the student's full name may be associated with an attribute for full name and may be identified by an attribute code of "FN", the student's sur name may be may be associated with an attribute for sur name and identified by an attribute code of "SN", and the student's given name may be associated with an attribute for given name and identified by an attribute code of "GN". Attributes and attribute codes may be helpful when the PII identifier represents more than one type of information. The manner in which the student's PII is partitioned and the types of attributes and attribute codes are typically based upon the requirements of the application. If the application uses a student's given name, sur name, and full name, then the attributes and attribute codes may be set up as illustrated in FIG. 2.

FIG. 2 illustrates that the privacy server may create a token by decorating the PII identifier. The privacy server may decorate the token by adding a start code and/or an end code to the beginning and/or ending of the PII identifier to indicate the beginning and/or ending of the token. FIG. 2 illustrates a start code of "#@" and an end code of "@#". However, any suitable start or end code may be used. In the alternative or in addition, the privacy server may decorate the token by adding an attribute code to the PII identifier to identify the type of PII. For example, FIG. 2 illustrates that the privacy server may add "FN" to indicate the student's full name, "SN" to indicate the student's sur name, and/or "GN" to indicate the student's given name.

The privacy server sends the token to the application server 106 instead of the student's PII. For example, if the teacher uploaded a spreadsheet with a student's full name, then the privacy server replaces the student's full name with a token and sends the spreadsheet with the token to the application server. In this example, the token may be "#@FN:12345@#". Similarly, if the teacher enters student PII into a registration form, then the privacy server replaces the student's full name with a token before sending the registration form to the application server. Only the token is sent to the application server. The privacy server does not send the student's PII to the application server.

The application receives the spreadsheet or registration form from the privacy server and registers the student with the application by storing the token in the LMS database 107. The application treats the token as a student identifier. The token is maintained in the LMS database so that the student's performance and progress can be tracked. In some instances the application, receives tokens for some students and PII for other students. If so, then the application treats the tokens in the same manner that it treats student PII. One benefit of the privacy server may be that the application does not need to be changed to protect PII since the protection is provided by the privacy server.

Figure 3:
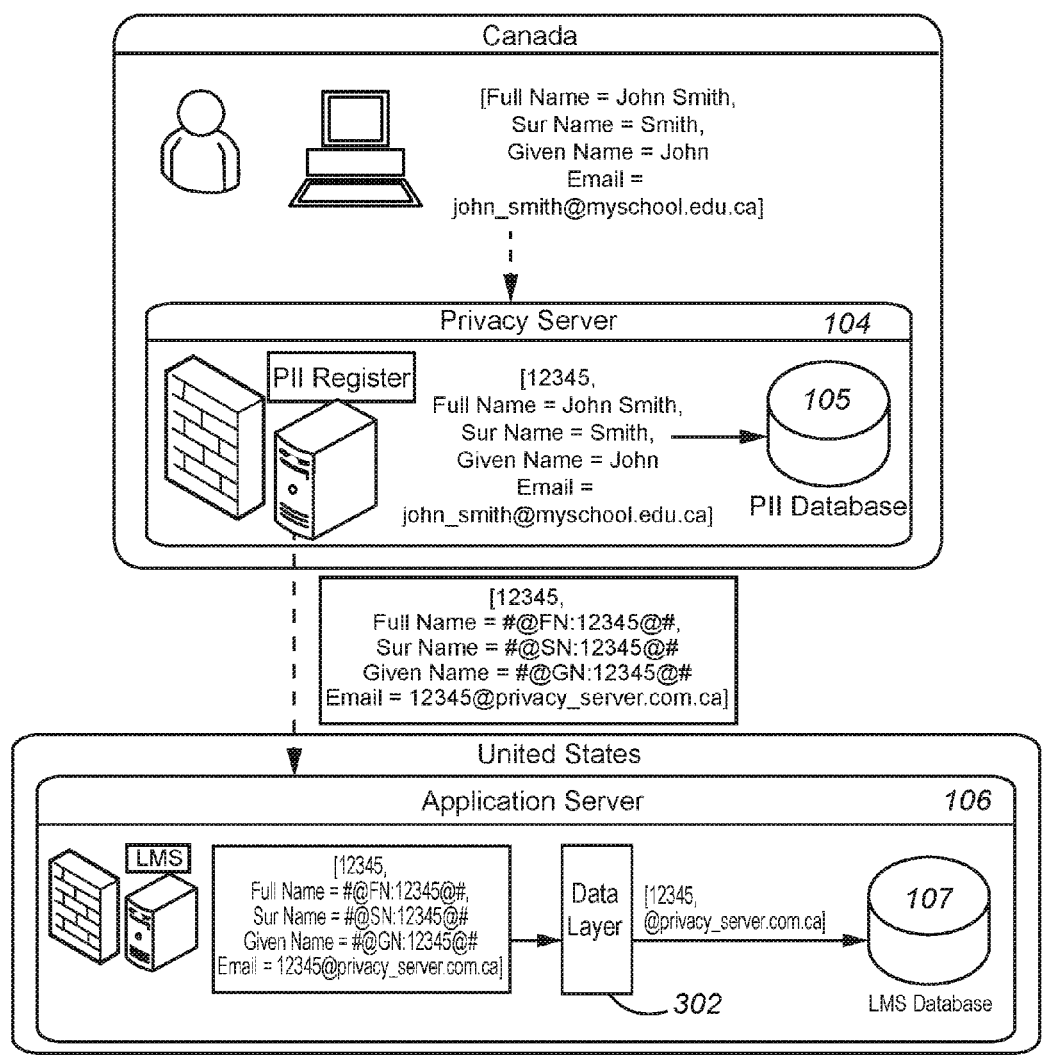
FIG. 3 is a block diagram illustrating another exemplary registration process using a privacy server.

In other instances, the application server only stores the PII identifier, not each token. One example of this is shown in FIG. 3 where the application server includes a data layer 302. The data layer receives a token, removes the decoration, i.e., removes any start/end codes and any attribute codes, and passes only the PII identifier to the database 107 for storage. The data layer also passes the e-mail domain of the privacy server to the database so that it is associated with the PII identifier. Prior to the application server communicating with the privacy server, the data layer may decorate the PII identifier so that the appropriate token is sent to the privacy server.

Figure 4:
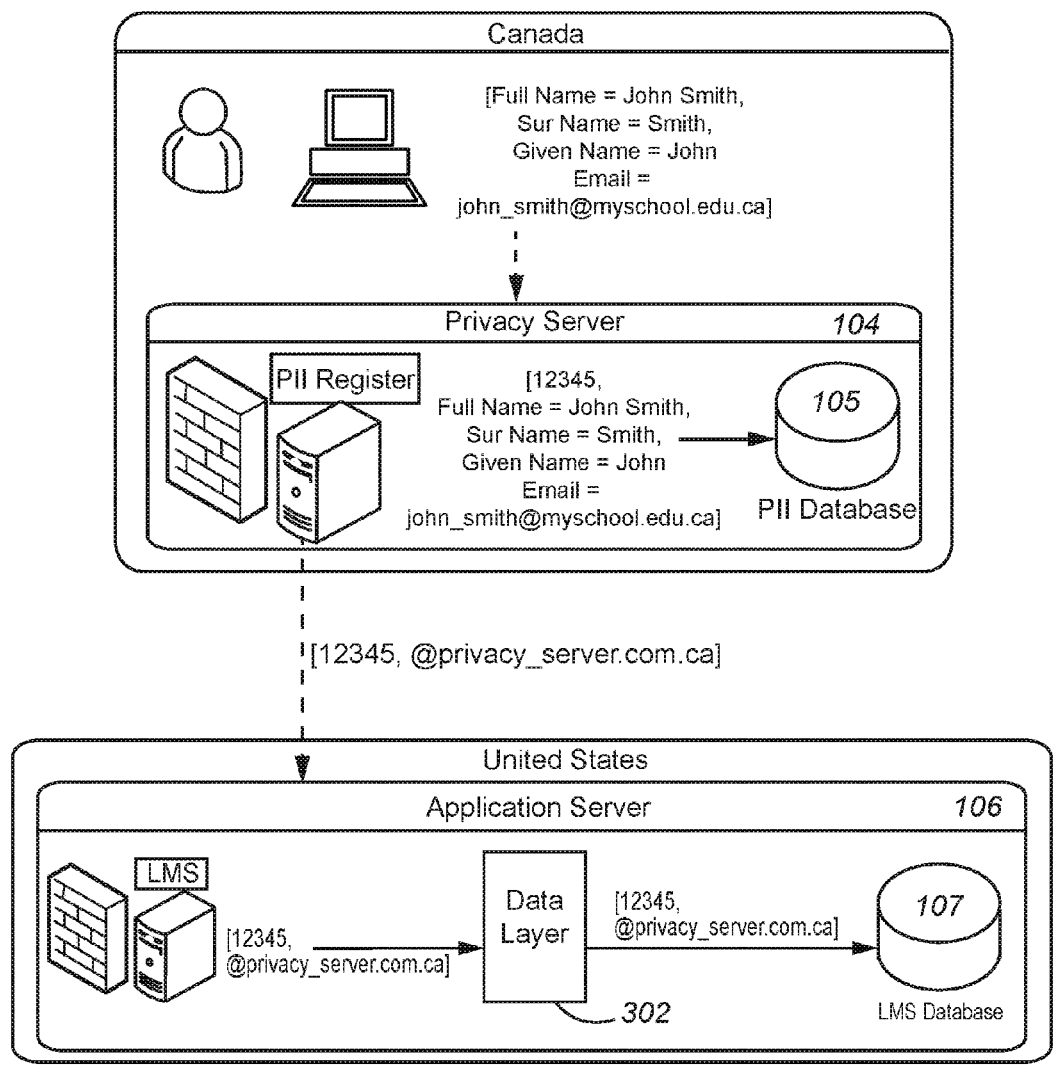
FIG. 4 is a block diagram illustrating yet another exemplary registration process using a privacy server.

In yet another instance, the privacy server does not decorate the PII identifier. As illustrated in FIG. 4, the privacy server creates a PII identifier, "12345", for a student and sends the PII identifier and the e-mail domain of the privacy server, "privacy—server.com.ca", to the application server. The data layer stores the PII identifier and the e-mail domain in the local database. The data layer uses the PII identifier and the e-mail domain to create an e-mail address when sending an e-mail to the student. In the examples illustrated by FIGS. 3 and 4, the application is aware that it is receiving a PII identifier from the privacy server and the data layer is capable of decorating the PII identifier or assembling an e-mail address using the PII identifier.

In some instances, the user may provide information or data to the application that does not need to be protected, such as anonymous information. If so, the privacy server allows the anonymous information or data to pass unaltered to the application server. If PII is provided along with anonymous information that does not need privacy protection, then the privacy server only substitutes a token or PII identifier for the PII and allows the anonymous information to pass unaltered to the application server. For example, if a registration form requests a student's name in one information field and a class name in another information field, then the privacy server may replace the student's name with a token, but allow the class name to pass through to the application server.

When the privacy server receives a communication from the application server that includes a token, the privacy server uses the token to locate the PII that corresponds to the token stored in the PII database and substitutes the appropriate PII. For example, if the teacher requests a report for a class of students, then the teacher may provide a class identifier, such as a class name or course number to the application. The application generates a report that includes the tokens for the names of the students in the class. The privacy server intercepts the report and substitutes the students' names for the tokens prior to providing the report to the teacher.

In some implementations, the privacy server determines that a communication includes a token by scanning the communication for token delimiters, such as a start and/or end code. In other implementations, the privacy server may be designed to scan particular document types, particular documents or particular web pages for tokens.

Figure 5:
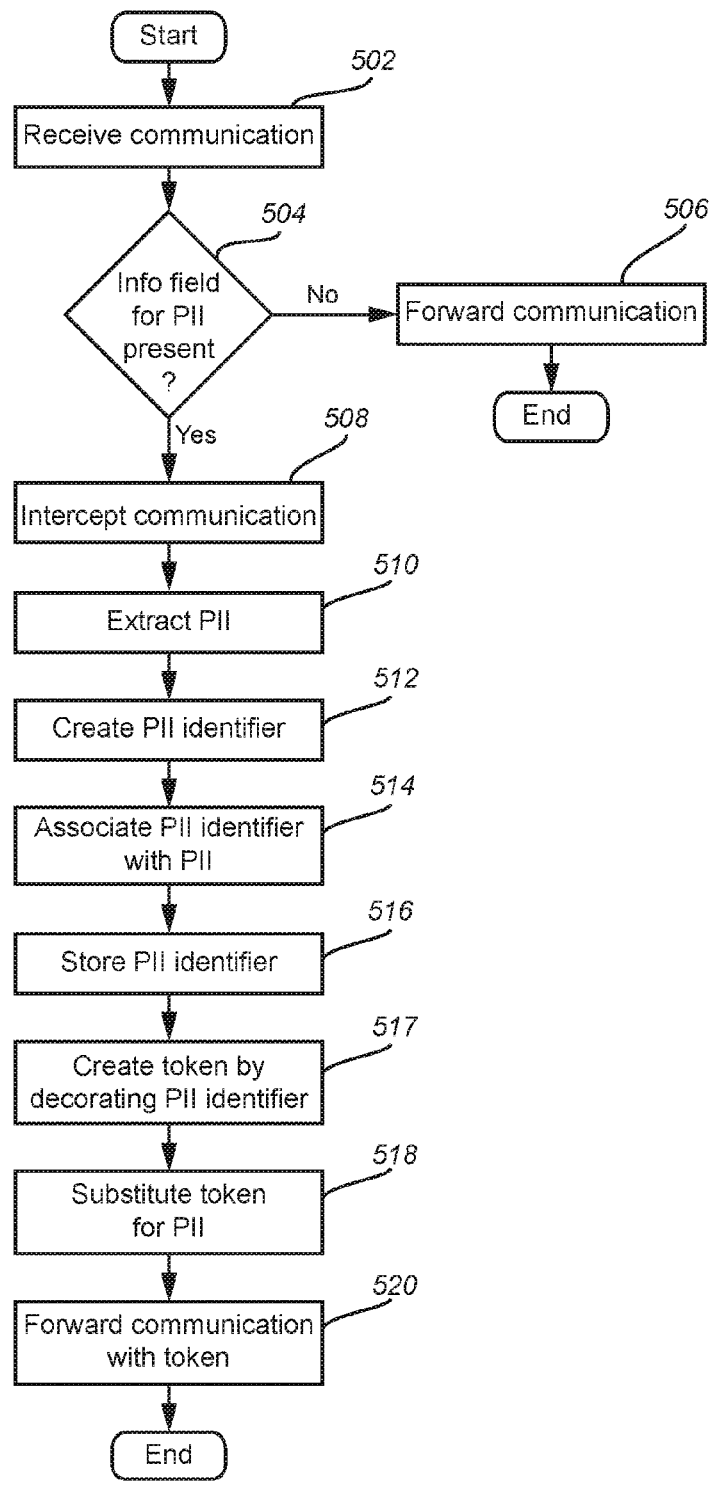
FIG. 5 is a flow diagram illustrating an exemplary process for creating a token.

An exemplary method for generating a token is illustrated by FIG. 5. The method starts when the privacy server receives a communication from the user's computer system in 502. The privacy server determines whether the communication includes PII in 504. For example, the privacy server may determine whether the communication includes a field associated with PII. If the communication does not include PII, then the method proceeds to 506 and the communication is forwarded without any modification. If the determination in 504 is that the communication includes PII, then the method proceeds to step 508 and the privacy server intercepts the communication. The privacy server extracts the PII in 510 and creates a PII identifier in 512. The privacy server associates the PII identifier with the PII in 514 and stores the PII identifier and the PII in a local database in 516. The privacy server creates a token by decorating the PII identifier in 517. Alternatively, the privacy server may use the PII identifier instead of a token. The privacy server substitutes the token for the PII in 518 and then forwards the communication with the token in 520 to the application server.

The privacy server may also serve as a proxy between a user and the application, as well as other applications or services since all communications from the user pass through the privacy server. This function is similar to that currently used to filter web traffic. When a user requests a web page, the web page request passes through the privacy server. If the web page request includes PII, then the privacy server replaces with PII with a token or PII identifier before the request is forwarded to the appropriate server.

Regardless of whether the web page request includes PII, the web page returned from the application server may include a token or PII identifier. The local database for the application server stores a token or a PII identifier instead of PII. If the web page includes an information field associated with PII, such as a name field, then the application server inserts the token or PII identifier into the field. The token or PII identifier can be retrieved from the local data base or the data layer can retrieve a PII identifier from the local data base and decorate it. When the privacy server receives the web page, it replaces the token or PII identifier with the appropriate PII prior to providing the web page to the user. In this manner the user receives a web page which includes the user's PII, even though the PII was never provided to the application server.

Figure 6:
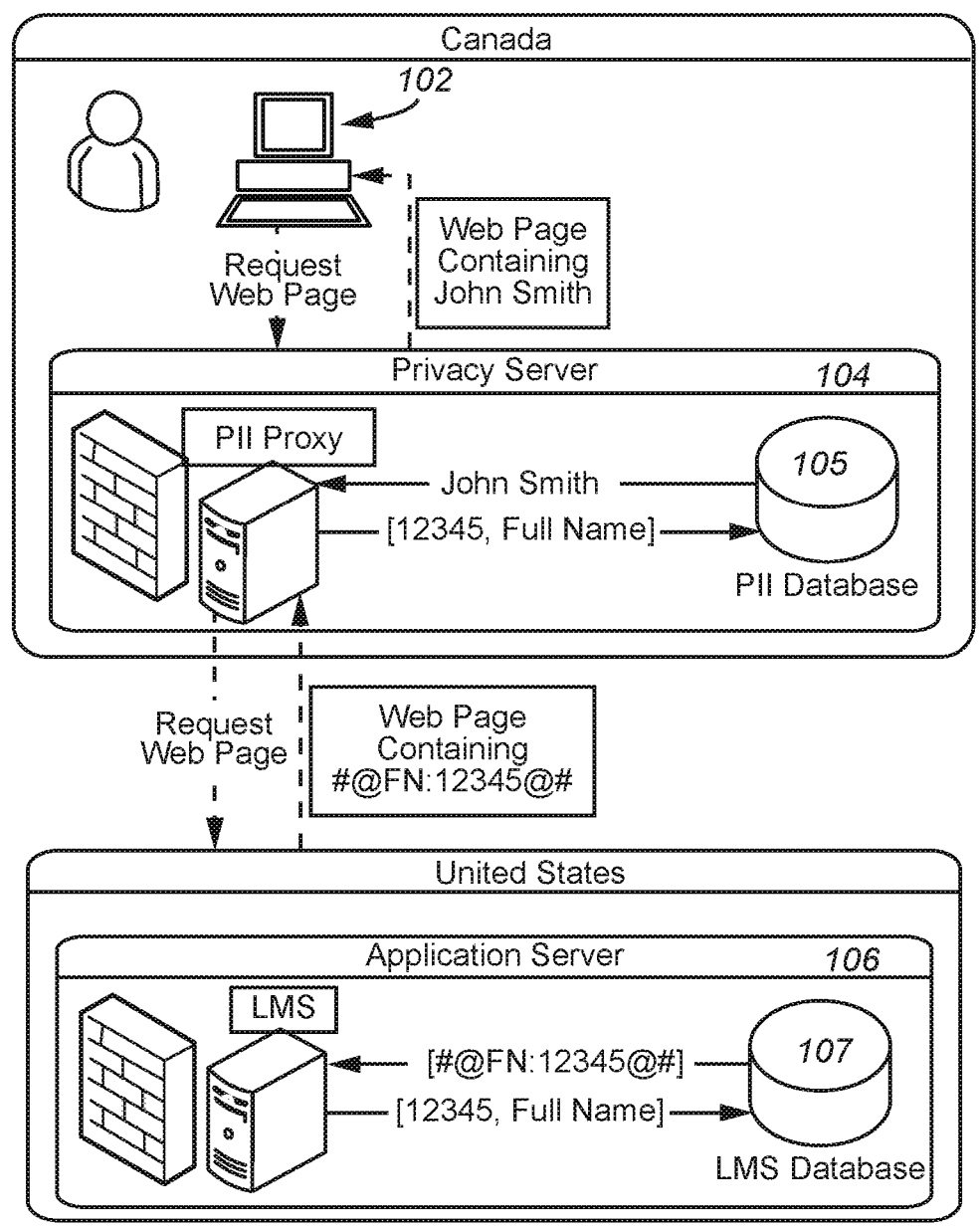
FIG. 6 is a block diagram illustrating an exemplary web page process using a privacy server.

FIG. 6 illustrates an exemplary web page request. The user sends a communication to the application server requesting the web page. The communication does not includes any PII so the communication is forwarded to the application server without any modifications. The application server determines that the web page is to include the full name of a student known to the application as "12345". The application server accesses the LMS database to retrieve the full name of student "12345". In this case, the LMS database includes a token for the full name of the student "#@FN: 12345@#". The application server includes the token in the field of the web page associated with the full name of the student. When the privacy server receives the web page, the privacy server recognizes that the web page contains a token and replaces the token with the appropriate PII. In this case the privacy server replaces the token "#@FN:12345@#" with the student's full name "John Smith" prior to presenting the web page to the user.

Figure 7:
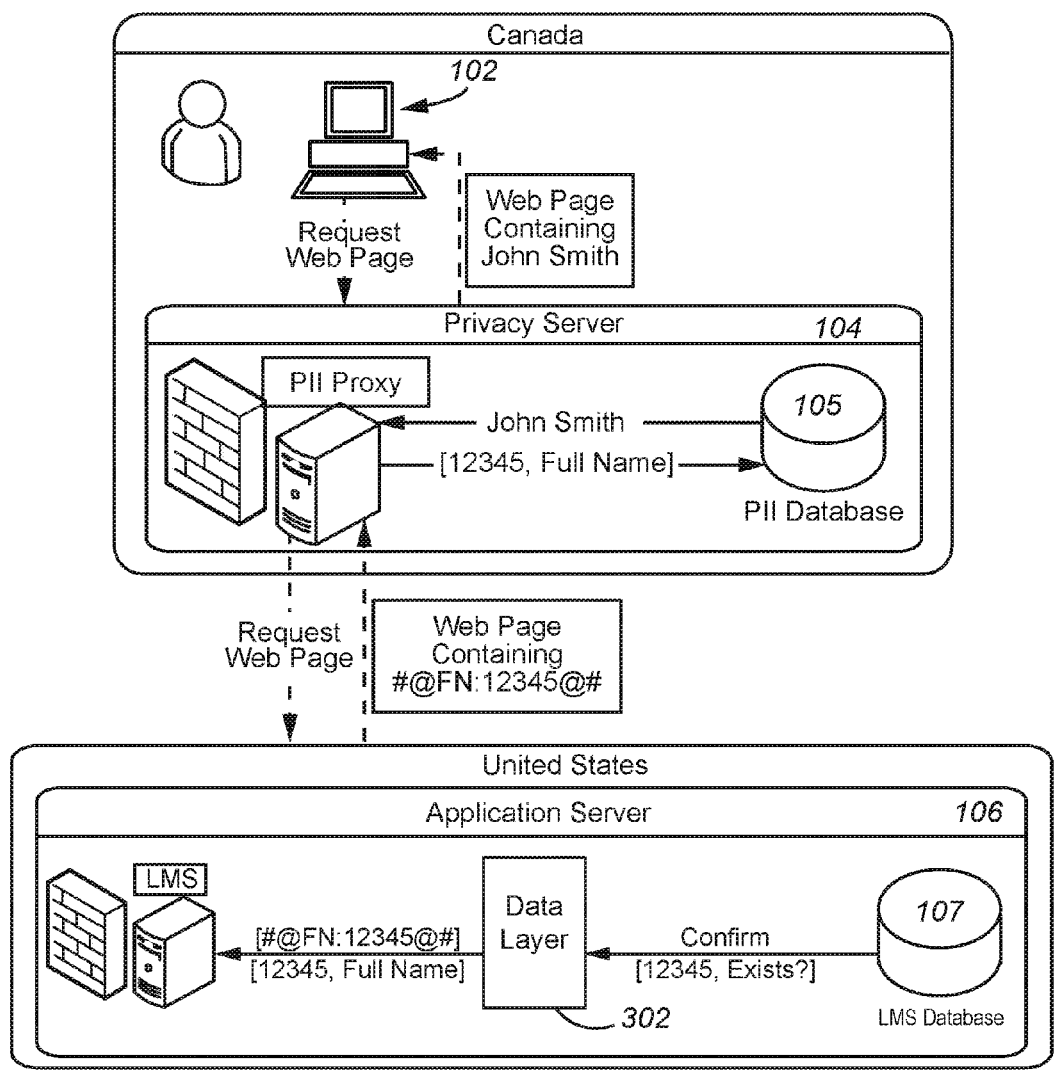
FIG. 7 is a block diagram illustrating another exemplary web page process using a privacy server.

FIG. 6 illustrates that the LMS database stores a token. In other instances, the LMS database may store the PII identifier and the data layer may decorate the PII identifier. For example, FIG. 7 illustrates the situation where the application server determines that the web page is to include the full name of a student known to the application as "12345". The data layer checks the LMS database to determine whether the database includes information for student "12345". If student "12345" exists in the LMS database, then the data layer decorates "12345" prior to sending the web page to the privacy server. In the example illustrated by FIG. 7, the data layer decorates "12345" with start and end codes, as well as an attribute code for the student's full name.

Figure 8:
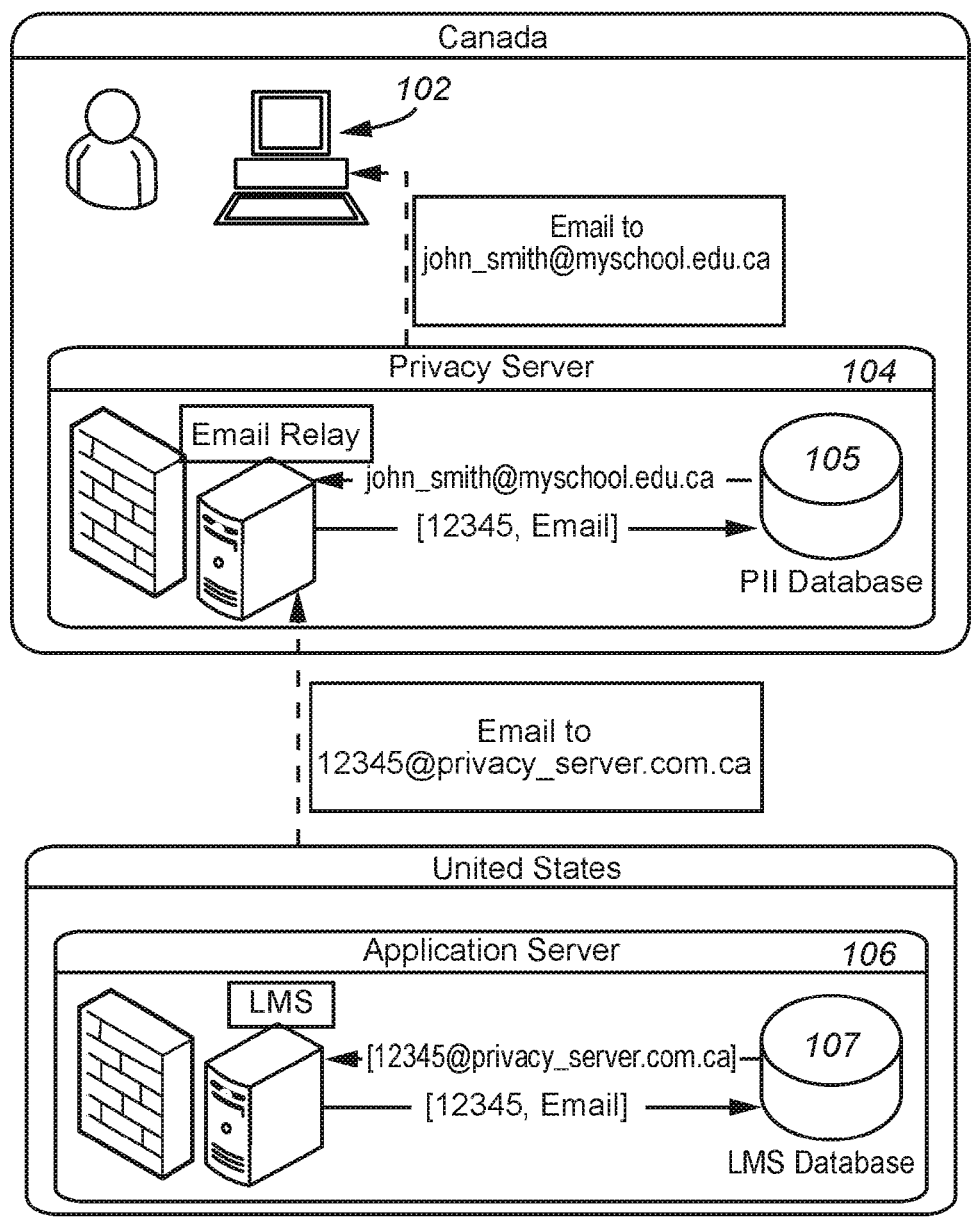
FIG. 8 is a block diagram illustrating an exemplary e-mail process using a privacy server.

The privacy server may also act as an e-mail relay since it can substitute an e-mail address the uses a PII identifier and the privacy server's e-mail domain for the user's e-mail address or forward an e-mail to the user's e-mail address that was received at the privacy server. FIG. 8 illustrates an example where the application initiates communication with a student or other user by sending an e-mail. Since the student is only identified to the application by a PII identifier, the application looks up the e-mail address for the student using the PII identifier. The application determines that the e-mail address for the student identified by PII identifier "12345" is "12345@privacy_server.com.ca". The application sends an e-mail to the student using that address. When the e-mail is received at the privacy server, the privacy server recognizes that the e-mail address includes the privacy server's e-mail domain. The privacy server uses the PII identifier to determine the corresponding e-mail address for the student and then substitutes the student's e-mail address for the received e-mail address. In the example illustrated by FIG. 8, the privacy server substitutes "john smith@myschool.edu.ca" for "12345@privacy_server.com.ca" before sending the e-mail on to the student. The student receives an e-mail addressed to the student's e-mail address with content created by the application even though the application did not know the student's e-mail address.

Figure 9:
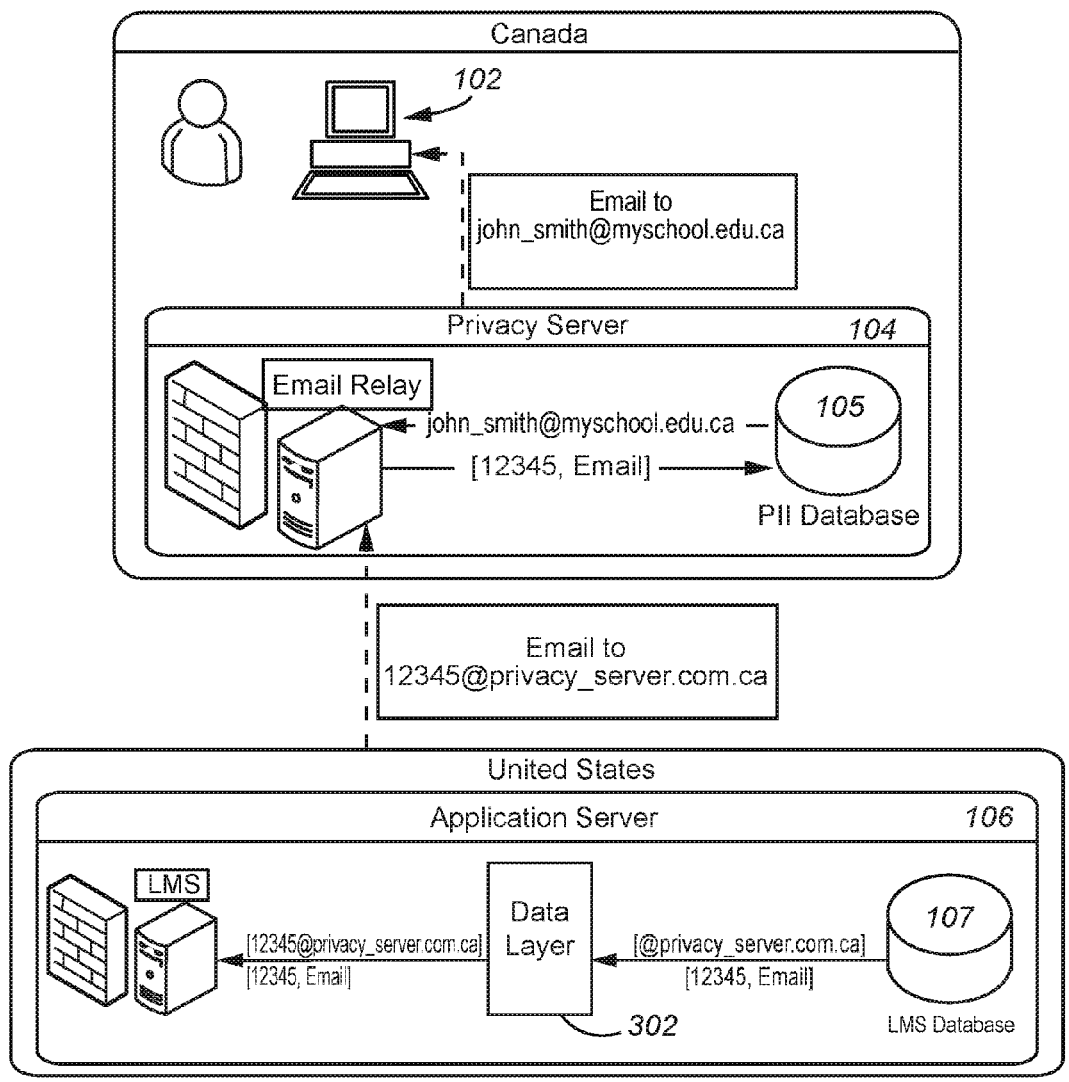
FIG. 9 is a block diagram illustrating another exemplary e-mail process using a privacy server.

FIG. 9 illustrates another example where the application initiates communication with a student or other user by sending an e-mail. Since the student is only identified by a PII identifier, the data layer looks up the e-mail address for the student using the PII identifier. The data layer determines that the student identified by PII identifier "12345" is associated with a privacy server that has an e-mail domain of privacy_server.com.ca. The data layer then addresses the e-mail to "12345@privacy_server.com.ca". When the e-mail is received at the privacy server, the privacy server uses the PII identifier to determine the corresponding e-mail address for the student and then substitutes the student's e-mail address for the received e-mail address. In the example illustrated by FIG. 9, the privacy server substitutes "john_smith@myschool.edu.ca" for "12345@privacy_server.com.ca" before sending the e-mail on to the student. The student receives an e-mail addressed to the student's e-mail address, but created by the application even though the application did not know the student's e-mail address.

The foregoing description of exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application to enable others skilled in the art to utilize the invention and various embodiments with various modifications as are suited to the particular use contemplated. Alternative embodiments will become apparent to those skilled in the art to which the present invention pertains without departing from its spirit and scope. For example, although the examples describe that the user is a teacher entering information about students, the user could be entering information about itself. In addition, the invention is not limited to a LMS or other educational application, but can be used with any system where privacy or protection of PII is a concern.

What is claimed is:

1. A non-transitory computer-readable medium capable of storing code for performing operations including:
   receiving a communication from a first computing device located in a first jurisdiction, wherein:
      the first jurisdiction includes geography that is not included in a second jurisdiction,
      the second jurisdiction includes other geography that is not included in the first jurisdiction, and
      content of the communication includes a full name and identifier of a user associated with the first jurisdiction or the second jurisdiction;
   analyzing the communication to determine whether the communication is intended to be transmitted to the second jurisdiction;
   determining that the content of the communication includes personally identifiable information associated with laws that restrict transmissions of the personally identifiable information; and
   when the content of the communication includes the personally identifiable information associated with the laws that restrict transmissions of the personally identifiable information:
      creating a token to replace the personally identifiable information in the content of the communication, wherein the token is substituted for the full name of the user,
      substituting the personally identifiable information in the content of the communication with the token, and
      transmitting the communication with the token instead of the personally identifiable information to a second computing device associated with the second jurisdiction.

2. The non-transitory computer-readable medium of claim 1, wherein the operations further include:
   storing the token in a local database.

3. The non-transitory computer-readable medium of claim 1, wherein the token comprises a pseudo-random token.

4. The non-transitory computer-readable medium of claim 1, wherein a class name or course number is not substituted with the token from the communication.

5. The non-transitory computer-readable medium of claim 1, wherein the operations further include:
   intercepting the communication.

6. The non-transitory computer-readable medium of claim 1, wherein the token includes a start code and an end code.

7. A method comprising:
   receiving a communication from a first computing device located in a first jurisdiction, wherein:
      the first jurisdiction includes geography that is not included in a second jurisdiction,
      the second jurisdiction includes other geography that is not included in the first jurisdiction, and
      content of the communication includes a full name and identifier of a user associated with the first jurisdiction or the second jurisdiction;
   analyzing the communication to determine whether the communication is intended to be transmitted to the second jurisdiction;
   determining that the content of the communication includes personally identifiable information associated with laws that restrict transmissions of the personally identifiable information; and
   when the content of the communication includes the personally identifiable information associated with the laws that restrict transmissions of the personally identifiable information:
      creating a token to replace the personally identifiable information in the content of the communication, wherein the token is substituted for the full name of the user,
      substituting the personally identifiable information in the content of the communication with the token, and
      transmitting the communication with the token instead of the personally identifiable information to a second computing device associated with the second jurisdiction.

8. The method of claim 7, further comprising:
   storing the token in a local database.

9. The method of claim 7, wherein the token comprises a pseudo-random token.

10. The method of claim 7, wherein a class name or course number is not substituted with the token from the communication.

11. The method of claim 7, further comprising:
    intercepting the communication.

12. The method of claim 7, wherein the token includes a start code and an end code.

13. A privacy server comprising:
    a processor; and
    a memory device including instructions that, when executed by the processor, cause the processor to:
    receive a communication from a first computing device located in a first jurisdiction, wherein:
       the first jurisdiction includes geography that is not included in a second jurisdiction,
       the second jurisdiction includes other geography that is not included in the first jurisdiction, and
       content of the communication includes a full name and identifier of a user associated with the first jurisdiction or the second jurisdiction;
    analyze the communication to determine whether the communication is intended to be transmitted to the second jurisdiction;
    determine that the content of the communication includes personally identifiable information associated with laws that restrict transmissions of the personally identifiable information; and
    when the content of the communication includes the personally identifiable information associated with the laws that restrict transmissions of the personally identifiable information:
       create a token to replace the personally identifiable information in the content of the communication, wherein the token is substituted for the full name of the user,
       substitute the personally identifiable information in the content of the communication with the token, and
       transmit the communication with the token instead of the personally identifiable information to a second computing device associated with the second jurisdiction.

14. The privacy server of claim 13, wherein the processor is further caused to:
    store the token in a local database.

15. The privacy server of claim 13, wherein the token comprises a pseudo-random token.

16. The privacy server of claim 13, wherein a class name or course number is not substituted with the token from the communication.

17. The privacy server of claim 13, wherein the processor is further caused to:
intercept the communication.

18. A non-transitory computer-readable medium capable of storing code for performing operations including:
receiving a communication from a first computing device located in a first jurisdiction, wherein:
the first jurisdiction includes geography that is not included in a second jurisdiction,
the second jurisdiction includes other geography that is not included in the first jurisdiction, and
content of the communication includes a name and identifier of a user associated with the first jurisdiction or the second jurisdiction;
analyzing the communication to determine whether the communication is intended to be transmitted to the second jurisdiction;
determining that the content of the communication includes personally identifiable information associated with laws that restrict transmissions of the personally identifiable information; and
when the content of the communication includes the personally identifiable information associated with the laws that restrict transmissions of the personally identifiable information:
creating a token to replace the personally identifiable information in the content of the communication, wherein the name of the user is substituted with the token from the communication and a class name or course number is not substituted with the token from the communication,
substituting the personally identifiable information in the content of the communication with the token, and
transmitting the communication with the token instead of the personally identifiable information to a second computing device associated with the second jurisdiction.

19. A method comprising:
receiving a communication from a first computing device located in a first jurisdiction, wherein:
the first jurisdiction includes geography that is not included in a second jurisdiction,
the second jurisdiction includes other geography that is not included in the first jurisdiction, and
content of the communication includes a name and identifier of a user associated with the first jurisdiction or the second jurisdiction;
analyzing the communication to determine whether the communication is intended to be transmitted to the second jurisdiction;
determining that the content of the communication includes personally identifiable information associated with laws that restrict transmissions of the personally identifiable information; and
when the content of the communication includes the personally identifiable information associated with the laws that restrict transmissions of the personally identifiable information:
creating a token to replace the personally identifiable information in the content of the communication, wherein the name of the user is substituted with the token from the communication and a class name or course number is not substituted with the token from the communication,
substituting the personally identifiable information in the content of the communication with the token, and
transmitting the communication with the token instead of the personally identifiable information to a second computing device associated with the second jurisdiction.

20. A privacy server comprising:
a processor; and
a memory device including instructions that, when executed by the processor, cause the processor to:
receive a communication from a first computing device located in a first jurisdiction, wherein:
the first jurisdiction includes geography that is not included in a second jurisdiction,
the second jurisdiction includes other geography that is not included in the first jurisdiction, and
content of the communication includes a name and identifier of a user associated with the first jurisdiction or the second jurisdiction;
analyze the communication to determine whether the communication is intended to be transmitted to the second jurisdiction;
determine that the content of the communication includes personally identifiable information associated with laws that restrict transmissions of the personally identifiable information; and
when the content of the communication includes the personally identifiable information associated with the laws that restrict transmissions of the personally identifiable information:
create a token to replace the personally identifiable information in the content of the communication, wherein the name of the user is substituted with the token from the communication and a class name or course number is not substituted with the token from the communication,
substitute the personally identifiable information in the content of the communication with the token, and
transmit the communication with the token instead of the personally identifiable information to a second computing device associated with the second jurisdiction.

21. A non-transitory computer-readable medium capable of storing code for performing operations including:
receiving a communication from a first computing device located in a first jurisdiction, wherein:
the first jurisdiction includes geography that is not included in a second jurisdiction,
the second jurisdiction includes other geography that is not included in the first jurisdiction, and
content of the communication includes a name and identifier of a user associated with the first jurisdiction or the second jurisdiction;
analyzing the communication to determine whether the communication is intended to be transmitted to the second jurisdiction;
determining that the content of the communication includes personally identifiable information associated with laws that restrict transmissions of the personally identifiable information; and
when the content of the communication includes the personally identifiable information associated with the laws that restrict transmissions of the personally identifiable information:
creating a token to replace the personally identifiable information in the content of the communication, wherein the token includes a start code and an end code, substituting the personally identifiable information in the content of the communication with the token, and transmitting the communication with the token instead of the personally identifiable information to a second computing device associated with the second jurisdiction.

22. A method comprising:

receiving a communication from a first computing device located in a first jurisdiction, wherein:
- the first jurisdiction includes geography that is not included in a second jurisdiction,
- the second jurisdiction includes other geography that is not included in the first jurisdiction, and
- content of the communication includes a name and identifier of a user associated with the first jurisdiction or the second jurisdiction;

analyzing the communication to determine whether the communication is intended to be transmitted to the second jurisdiction;

determining that the content of the communication includes personally identifiable information associated with laws that restrict transmissions of the personally identifiable information; and when the content of the communication includes the personally identifiable information associated with the laws that restrict transmissions of the personally identifiable information:
- creating a token to replace the personally identifiable information in the content of the communication, wherein the token includes a start code and an end code,
- substituting the personally identifiable information in the content of the communication with the token, and
- transmitting the communication with the token instead of the personally identifiable information to a second computing device associated with the second jurisdiction.

23. A privacy server comprising:

a processor; and a memory device including instructions that, when executed by the processor, cause the processor to:

receive a communication from a first computing device located in a first jurisdiction, wherein:
- the first jurisdiction includes geography that is not included in a second jurisdiction,
- the second jurisdiction includes other geography that is not included in the first jurisdiction, and
- content of the communication includes a name and identifier of a user associated with the first jurisdiction or the second jurisdiction;

analyze the communication to determine whether the communication is intended to be transmitted to the second jurisdiction;

determine that the content of the communication includes personally identifiable information associated with laws that restrict transmissions of the personally identifiable information; and when the content of the communication includes the personally identifiable information associated with the laws that restrict transmissions of the personally identifiable information:
- create a token to replace the personally identifiable information in the content of the communication, wherein the token includes a start code and an end code,
- substitute the personally identifiable information in the content of the communication with the token, and
- transmit the communication with the token instead of the personally identifiable information to a second computing device associated with the second jurisdiction.

* * * * *